(12) United States Patent
Chuang

(10) Patent No.: US 9,780,641 B1
(45) Date of Patent: Oct. 3, 2017

(54) PROTECTION CIRCUIT WITH SURGE PROTECTION CAPABILITY

(71) Applicants: Lite-On Electronics (Guangzhou) Limited, Guangzhou (CN); LITE-ON TECHNOLOGY CORPORATION, Taipei (TW)

(72) Inventor: Ming-Cheng Chuang, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/229,609

(22) Filed: Aug. 5, 2016

(30) Foreign Application Priority Data

Jun. 20, 2016 (CN) .......................... 2016 1 0451646

(51) Int. Cl.
*H02M 1/32* (2007.01)
*H02M 7/06* (2006.01)
*H02M 7/219* (2006.01)

(52) U.S. Cl.
CPC ............... *H02M 1/32* (2013.01); *H02M 7/06* (2013.01); *H02M 7/219* (2013.01)

(58) Field of Classification Search
None
See application file for complete search history.

(56) References Cited

U.S. PATENT DOCUMENTS

| 9,673,695 | B1* | 6/2017 | Li ........................... | H02M 1/32 |
| 2010/0078998 | A1* | 4/2010 | Wei ........................ | H02M 5/458 |
| | | | | 307/31 |
| 2016/0172992 | A1* | 6/2016 | Tallam .................. | H02M 7/062 |
| | | | | 363/37 |
| 2016/0204709 | A1* | 7/2016 | Patel ....................... | H02M 5/44 |
| | | | | 363/37 |
| 2016/0268797 | A1* | 9/2016 | Li ........................ | H02M 5/4585 |

\* cited by examiner

*Primary Examiner* — Jeffrey Gblende
(74) *Attorney, Agent, or Firm* — WPAT, PC

(57) ABSTRACT

A protection circuit includes a pre-charge rectifying circuit, a pre-charge resistor, a varistor, a switch, a main rectifying circuit, a bulk capacitor, and a control circuit. The pre-charge rectifying circuit is connected with an AC power source. The pre-charge resistor and the varistor are connected between the pre-charge rectifying circuit and the switch. The switch is further connected with a first node. The main rectifying circuit is connected between the AC power source and the first node. The bulk capacitor and the control circuit are connected between the first node and a ground terminal. The control circuit generates a first control signal to control the switch. The control circuit further generates a control signal set to control the main rectifying circuit.

6 Claims, 2 Drawing Sheets

US 9,780,641 B1

PROTECTION CIRCUIT WITH SURGE PROTECTION CAPABILITY

This application claims the benefit of People's Republic of China Patent Application No. 201610451646.0, filed Jun. 20, 2016, the subject matter of which is incorporated herein by reference.

FIELD OF THE INVENTION

The present invention relates to a protection circuit, and more particularly to a protection circuit with surge protection capability.

BACKGROUND OF THE INVENTION

FIG. 1A is a schematic circuit diagram illustrating a conventional inverter. The conventional inverter is connected with a load such as a three phase DC motor (not shown). As shown in FIG. 1A, the conventional inverter 100 comprises a magnetic contactor 110, a pre-charge resistor Rp, a main rectifying circuit 130, a bulk capacitor Cb, a control circuit 140 and a driving circuit 150.

The magnetic contactor 110 comprises a normally-off switch set with three switches b1, b2 and b3. Before the control signal Sc applied to a control terminal of the magnetic contactor 110 is activated, the switches b1, b2 and b3 of the normally-off switch set are in an open state. After the control signal Sc applied to the control terminal of the magnetic contactor 110 is activated, the switches b1, b2 and b3 of the normally-off switch set are in a close state.

Please refer to FIG. 1A again. A three phase AC power source (R, S, T) is connected with three AC input terminals of the main rectifying circuit 130. The pre-charge resistor Rp is connected between a DC output terminal of the main rectifying circuit 130 and a node o. Moreover, the switches b1, b2 and b3 of the normally-off switch set of the magnetic contactor 110 are connected with the pre-charge resistor Rp in parallel.

Moreover, the bulk capacitor Cb, the control circuit 140 and the driving circuit 150 are connected between the node o and a ground terminal Gnd. The control circuit 140 issues a control signal Sc to the magnetic contactor 110. Moreover, the control circuit 140 generates plural driving signals Sd1~Sd6 to the driving circuit 150. According to the driving signals Sd1~Sd6, the output signals Va, Vb and Vc from plural output terminals of the driving circuit 150 are adjusted to control the three phase DC motor.

Generally, a pre-charge path is defined by the main rectifying circuit 130 and the pre-charge resistor Rp collaboratively, and a main charge path is defined by the main rectifying circuit 130 and the magnetic contactor 110 collaboratively.

The operating principles of the conventional inverter 100 will be described in more details as follows.

When the three phase AC power source (R, S, T) is just connected with the magnetic contactor 110, the control circuit 140 is still disabled. Consequently, the control signal Sc is not outputted. At the same time, the electric energy from the three phase AC power source (R, S, T) is inputted into the three AC input terminals of the main rectifying circuit 130. Consequently, a DC voltage is outputted from a DC output terminal of the main rectifying circuit 130 to charge the bulk capacitor Cb through the pre-charge resistor Rp. Before the voltage of the bulk capacitor Cb reaches a steady state voltage Vdc, the control circuit 140 is disabled.

After the bulk capacitor Cb is charged to the steady state voltage Vdc, the control circuit 140 is enabled to output the control signal Sc. Meanwhile, the switches b1, b2 and b3 of the normally-off switch set of the magnetic contactor 110 are switched to the close state. Under this circumstance, the steady state voltage Vdc from the DC output terminal of the main rectifying circuit 130 is transmitted through the switches b1, b2 and b3 to charge the bulk capacitor Cb without being transmitted through the pre-charge resistor Rp.

When the control circuit 140 is enabled, the control circuit 140 generates the plural driving signals Sd1~Sd6 to the driving circuit 150. According to the driving signals Sd1~Sd6, the output signals Va, Vb and Vc from plural output terminals of the driving circuit 150 are adjusted.

FIG. 1B is a schematic circuit diagram illustrating the driving circuit of the conventional inverter. As shown in FIG. 1B, the driving circuit 150 comprises six transistors Q1~Q6. The collector of the first transistor Q1 receives the steady state voltage Vdc. The base of the first transistor Q1 receives the first driving signal Sd1. The emitter of the first transistor Q1 is connected with the node x. The collector of the second transistor Q2 receives the steady state voltage Vdc. The base of the second transistor Q2 receives the second driving signal Sd2. The emitter of the second transistor Q2 is connected with the node y. The collector of the third transistor Q3 receives the steady state voltage Vdc. The base of the third transistor Q3 receives the third driving signal Sd3. The emitter of the third transistor Q3 is connected with the node z.

The collector of the fourth transistor Q4 is connected with the node x. The base of the fourth transistor Q4 receives the fourth driving signal Sd4. The emitter of the fourth transistor Q4 is connected with the ground terminal Gnd. The collector of the fifth transistor Q5 is connected with the node y. The base of the fifth transistor Q5 receives the fifth driving signal Sd5. The emitter of the fifth transistor Q5 is connected with the ground terminal Gnd. The collector of the sixth transistor Q6 is connected with the node z. The base of the sixth transistor Q6 receives the sixth driving signal Sd6. The emitter of the sixth transistor Q6 is connected with the ground terminal Gnd. Moreover, the nodes x, y and z are the output terminals of the driving circuit 150. The output signals Va, Vb and Vc are outputted from the output terminals of the driving circuit 150 to control the three phase DC motor.

Generally, the control circuit 140 generates the driving signals Sd1~Sd6 to control the on/off states of the corresponding transistors Q1~Q6 in order to adjust the waveforms of the output signals Va, Vb and Vc.

After the inverter 100 is fabricated, it is necessary to perform a surge immunity test. Generally, the magnetic contactor 110 can withstand a high voltage. When the main rectifying circuit 130 is enabled, a large current in response to a surge voltage of about 4 kV flows to the bulk capacitor Cb through the main rectifying circuit 130 and the magnetic contactor 110 successfully. Since the inverter 100 is not adversely affected by the surge voltage, the inverter 100 passes the surge immunity test.

However, since the volume of the magnetic contactor 110 is very large, the volume of the inverter 100 is also very large. For reducing the volume of the inverter 100, the magnetic contactor 110 is replaced by a smaller electronic component. However, the inverter 100 is possibly unable to pass the surge immunity test.

SUMMARY OF THE INVENTION

An embodiment of the present invention provides a protection circuit. The protection circuit includes a pre-charge rectifying circuit, a pre-charge resistor, a varistor, a switch, a main rectifying circuit, a bulk capacitor, and a control circuit. The pre-charge rectifying circuit is connected with an AC power source. A first terminal of the pre-charge resistor is connected with a DC output terminal of the pre-charge rectifying circuit. A first terminal of the varistor is connected with the DC output terminal of the pre-charge rectifying circuit. A first terminal of the switch is connected with a second terminal of the pre-charge resistor. A second terminal of the switch is connected with a second terminal of the varistor. A third terminal of the switch is connected with a first node. When a first control signal received by the switch is inactivated, the first terminal of the switch is connected with the third terminal of the switch. When the first control signal is activated, the second terminal of the switch is connected with the third terminal of the switch. The main rectifying circuit is connected with the AC power source. A DC output terminal of the main rectifying circuit is connected with the first node. The bulk capacitor is connected between the first node and a ground terminal. The control circuit is connected between the first node and the ground terminal, wherein the control circuit issues the first control signal to the switch, and the control circuit further issues a control signal set to the main rectifying circuit.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a protection circuit with surge protection capability. When the protection circuit is applied to an inverter, the inverter is not equipped with the magnetic contactor that has larger volume. Consequently, the volume of the inverter is reduced, and the inverter has the surge protection capability.

Figures 2A, 2B:
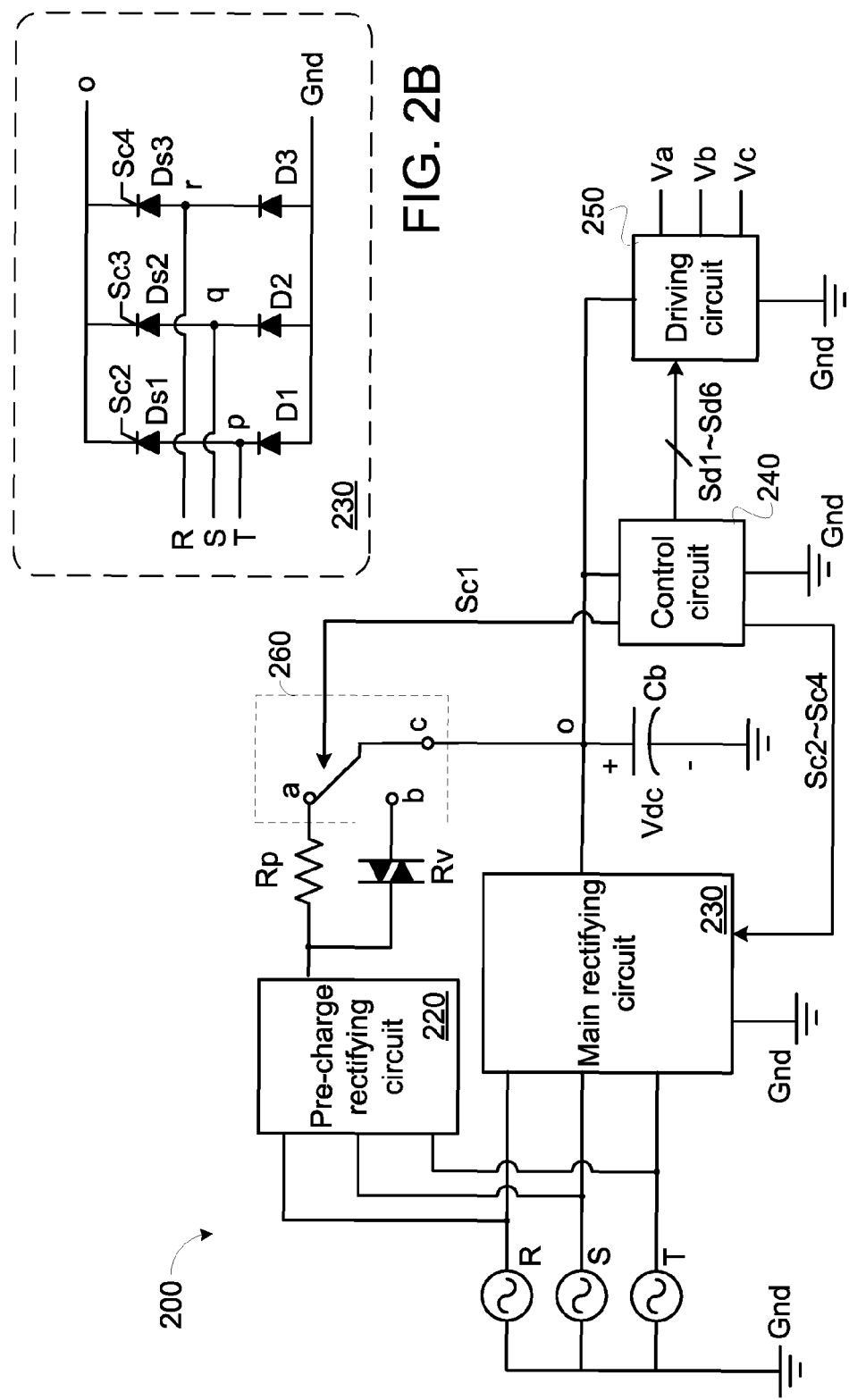
FIG. 2A is a schematic circuit diagram illustrating a protection circuit applied to an inverter according to an embodiment of the present invention.
FIG. 2B is a schematic circuit diagram illustrating the main rectifying circuit of the inverter of FIG. 2A.

FIG. 2A is a schematic circuit diagram illustrating a protection circuit applied to an inverter according to an embodiment of the present invention. The protection circuit is applied to an inverter 200. Moreover, the protection circuit is connected with a load (not shown). As shown in FIG. 2A, the protection circuit comprises a pre-charge rectifying circuit 220, a pre-charge resistor Rp, a varistor Rv, a switch 260, a main rectifying circuit 230, a bulk capacitor Cb and a control circuit 240. In case that the protection circuit is applied to the inverter 200, the protection circuit further comprises a driving circuit 250. The resistance of the varistor Rv varies with the voltage of the two terminals of the varistor Rv. If a high voltage (e.g., a surge voltage) is applied to the two terminals of the varistor Rv, the varistor Rv has the low resistance. Whereas, if a low voltage is applied to the two terminals of the varistor Rv, the varistor Rv has the high resistance.

Please refer to FIG. 2A again. A three phase AC power source (R, S, T) is connected with three AC input terminals of the main rectifying circuit 230. A DC output terminal of the main rectifying circuit 230 is connected with a node o.

Moreover, the three phase AC power source (R, S, T) is also connected with three AC input terminals of the pre-charge rectifying circuit 220. A DC output terminal of the pre-charge rectifying circuit 220 is connected with a first terminal of the pre-charge resistor Rp and a first terminal of the varistor Rv. A first terminal a of the switch 260 is connected with a second terminal of the pre-charge resistor Rp. A second terminal b of the switch 260 is connected with a second terminal of the varistor Rv. A third terminal c of the switch 260 is connected with the node o. A control terminal of the switch 260 receives a first control signal Sc1. When the first control signal Sc1 is inactivated, the first terminal a of the switch 260 is connected with the third terminal c of the switch 260. When the first control signal Sc1 is activated, the second terminal b of the switch 260 is connected with the third terminal c of the switch 260.

The bulk capacitor Cb, the control circuit 240 and the driving circuit 250 are connected with the node o and the ground Gnd. The control circuit 240 generates the first control signal Sc1 to the switch 260. Moreover, the control circuit 240 generates a control signal set to the main rectifying circuit 230. The control signal set contains three control signals Sc2~Sc4. Moreover, the control circuit 240 generates a driving signal set to the driving circuit 250. The driving signal set contains plural driving signals Sd1~Sd6. According to the driving signals Sd1~Sd6, the output signals Va, Vb and Vc from plural output terminals of the driving circuit 250 are adjusted.

When the first control signal Sc1 is inactivated, the pre-charge resistor Rp is connected with the node o through the switch 260. When the first control signal Sc1 is activated, the varistor Rv is connected with the node o through the switch 260. Moreover, when the three control signals Sc2~Sc4 are inactivated, the main rectifying circuit 230 is disabled. When the three control signals Sc2~Sc4 are activated, the main rectifying circuit 230 is enabled.

When the three phase AC power source (R, S, T) is just connected with the inverter 200, the control circuit 240 is still disabled. Consequently, the first control signal Sc1 is inactivated. Meanwhile, the first terminal a of the switch 260 is connected with the third terminal c of the switch 260. Since the other three control signals Sc2~Sc4 are inactivated, the main rectifying circuit 230 is disabled.

At the same time, the electric energy from the three phase AC power source (R, S, T) is inputted into the three AC input terminals of the pre-charge rectifying circuit 220. Consequently, a DC voltage is outputted from a DC output terminal of the pre-charge rectifying circuit 220 to charge the bulk capacitor Cb through the pre-charge resistor Rp. Before the voltage of the bulk capacitor Cb reaches a steady state voltage Vdc, the control circuit 240 is disabled.

After the bulk capacitor Cb is charged to the steady state voltage Vdc, the control circuit 240 is enabled, and all of the control signals Sc1~Sc4 are activated. Meanwhile, the second terminal b of the switch 260 is connected with the third terminal c of the switch 260. Consequently, the main rectifying circuit 230 is enabled.

After the first control signal Sc1 is activated, the varistor Rv has the high resistance because the varistor Rv is connected between the DC output terminal of the pre-charge rectifying circuit 220 and the node o, and the DC voltage from the pre-charge rectifying circuit 220 is not very high. Under this circumstance, the region between the DC output terminal of the pre-charge rectifying circuit 220 and the node o is considered as an open circuit.

After the three control signals Sc2~Sc4 are activated, the main rectifying circuit 230 is enabled. Meanwhile, the electric energy from the three phase AC power source (R, S, T) is inputted into the three AC input terminals of the main rectifying circuit 230. Consequently, the steady state voltage Vdc from the DC terminal of the main rectifying circuit 230 is transmitted to the bulk capacitor Cb.

Figure 1A:
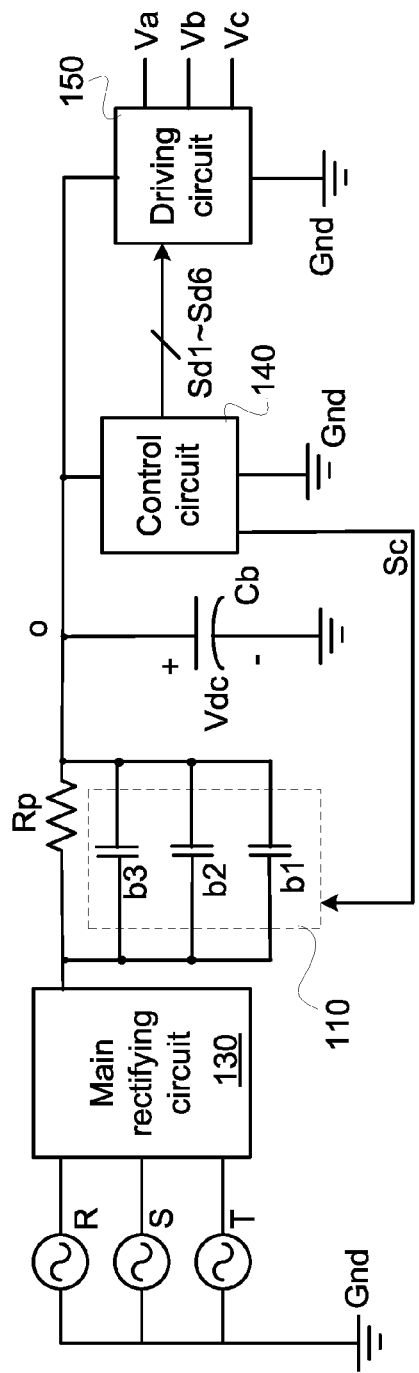
FIG. 1A (prior art) is a schematic circuit diagram illustrating a conventional inverter.
Figure 1B:
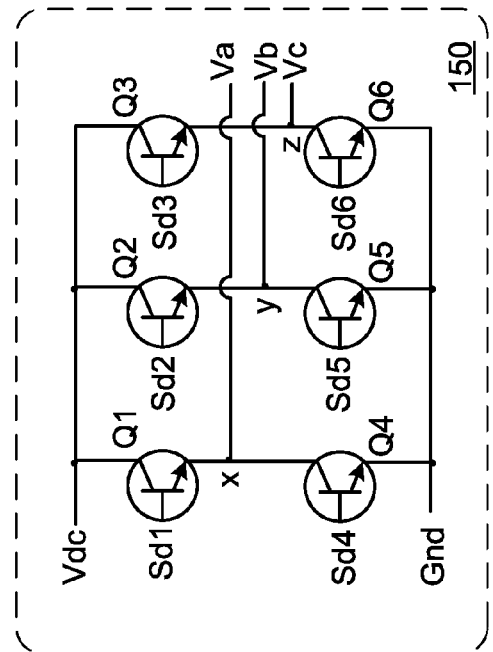
FIG. 1B (prior art) is a schematic circuit diagram illustrating the driving circuit of the conventional inverter.

The driving circuit of the inverter of FIG. 1B can be applied to the inverter of this embodiment. When the control circuit 240 is enabled, the driving signals Sd1~Sd6 are generated to control the on/off states of the corresponding transistors Q1~Q6 in order to adjust the waveforms of the output signals Va, Vb and Vc. Consequently, the operations of the load (e.g., a three phase DC motor) are controlled.

FIG. 2B is a schematic circuit diagram illustrating the main rectifying circuit of the inverter of FIG. 2A. As shown in FIG. 2B, the main rectifying circuit 230 comprises three diodes D1~D3 and three silicon controlled rectifiers (SCR) Ds1~Ds3. The anode of the first diode D1 is connected with the ground terminal Gnd. The cathode of the first diode D1 is connected with a node p. The anode of second diode D2 is connected with the ground terminal Gnd. The cathode of the second diode D2 is connected with a node q. The anode of the third diode D3 is connected with the ground terminal Gnd. The cathode of the third diode D3 is connected with a node r.

The anode of the first silicon controlled rectifier Ds1 is connected with the node p. The cathode of the first silicon controlled rectifier Ds1 is connected with the node the node o. The gate control terminal of the first silicon controlled rectifier Ds1 receives the second control signal Sc2. The anode of the second silicon controlled rectifier Ds2 is connected with the node the node q. The cathode of the second silicon controlled rectifier Ds2 is connected with the node o. The gate control terminal of the second silicon controlled rectifier Ds2 receives the third control signal Sc3. The anode of the third silicon controlled rectifier Ds3 is connected with the node the node r. The cathode of the third silicon controlled rectifier Ds3 is connected with the node o. The gate control terminal of the third silicon controlled rectifier Ds3 receives the fourth control signal Sc4. Moreover, the three nodes p, q and r are also connected with the three phase AC power source (R, S, T).

When the three control signals Sc2~Sc4 are activated, the three silicon controlled rectifiers Ds1~Ds3 are enabled. Consequently, the main rectifying circuit 230 is enabled to rectify the electric energy of the three phase AC power source (R, S, T).

Generally, the silicon controlled rectifier can withstand the highest voltage of about 1.4 KV. However, the surge voltage in the surge immunity test is about 4 kV. That is, the surge voltage possibly burns out the silicon controlled rectifiers Ds1~Ds3 of the main rectifying circuit 230.

In accordance with the present invention, the varistor Rv is connected between the DC output terminal of the pre-charge rectifying circuit 220 and the node o. When the inverter 200 is in normal operation, the voltage applied to the two terminals of the varistor Rv is very low and the resistance of the varistor Rv is very high. Under this circumstance, the region between the DC output terminal of the pre-charge rectifying circuit 220 and the node o is considered as an open circuit.

While the inverter 200 is subjected to the surge immunity test, the resistance of the varistor Rv becomes very low because the surge voltage is about 4 kV. Meanwhile, the region between the DC output terminal of the pre-charge rectifying circuit 220 and the node o is considered as a short circuit.

In response to the surge voltage, a large magnitude of current is generated. A greater portion of the current flows through the pre-charge rectifying circuit 220 and the varistor Rv to the bulk capacitor Cb. A smaller portion of the current is transmitted to the bulk capacitor Cb through the main rectifying circuit 230. Under this circumstance, the three silicon controlled rectifiers Ds1~Ds3 of the main rectifying circuit 230 will not be burnt out. Consequently, the main rectifying circuit 230 is normally operated, and inverter 200 passes the surge immunity test.

From the above descriptions, the present invention provides a protection circuit for an inverter. The protection circuit is not equipped with a magnetic contactor. Consequently, the volume of the inverter is reduced. When the control circuit is normally operated, the varistor Rv is connected with the node o through the switch. In case that the inverter is suffered from a surge voltage, the current with a large magnitude can be effectively transmitted to the bulk capacitor Cb through the varistor Rv. Consequently, the main rectifying circuit is not burnt out. In other words, the inverter with the protection circuit according to the present invention has surge protection capability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A protection circuit, comprising:
   a pre-charge rectifying circuit connected with an AC power source;
   a pre-charge resistor, wherein a first terminal of the pre-charge resistor is connected with a DC output terminal of the pre-charge rectifying circuit;
   a varistor, wherein a first terminal of the varistor is connected with the DC output terminal of the pre-charge rectifying circuit;
   a switch having a first terminal connected with a second terminal of the pre-charge resistor, a second terminal connected with a second terminal of the varistor, and a third terminal connected with a first node, wherein when a first control signal received by the switch is inactivated, the first terminal of the switch is connected with the third terminal of the switch, wherein when the first control signal is activated, the second terminal of the switch is connected with the third terminal of the switch;
   a main rectifying circuit connected with the AC power source, wherein a DC output terminal of the main rectifying circuit is connected with the first node;

a bulk capacitor connected between the first node and a ground terminal; and a control circuit connected between the first node and the ground terminal, wherein the control circuit issues the first control signal to the switch, and the control circuit further issues a control signal set to the main rectifying circuit.

2. The protection circuit as claimed in claim 1, wherein when the AC power source is just connected with the protection circuit, the first control signal and the control signal set are inactivated by the control circuit, and the pre-charge rectifying circuit provides a DC voltage to charge the bulk capacitor through the pre-charge resistor.

3. The protection circuit as claimed in claim 2, where when the bulk capacitor is charged to a steady state voltage by the pre-charge rectifying circuit, the first control signal and the control signal set are activated by the control circuit, and the main rectifying circuit generates the steady state voltage to the bulk capacitor.

4. The protection circuit as claimed in claim 1, wherein when the protection circuit generates a current in response to a surge voltage, a first portion of the current is transmitted to the bulk capacitor through the pre-charge rectifying circuit and the varistor, and a second portion of the current is transmitted to bulk capacitor through the main rectifying circuit.

5. The protection circuit as claimed in claim 1, wherein the main rectifying circuit comprises:

a first diode, wherein an anode of the first diode is connected with the ground terminal, and a cathode of the first diode is connected with a second node;

a second diode, wherein an anode of the second diode is connected with the ground terminal, and a cathode of the second diode connected with a third node;

a third diode, wherein an anode of the third diode is connected with the ground terminal, and a cathode of the third diode is connected with a fourth node;

a first silicon controlled rectifier, wherein an anode of the first silicon controlled rectifier is connected with the second node, a cathode of the first silicon controlled rectifier is connected with the first node, and a gate control terminal of the first silicon controlled rectifier receives a second control signal of the control signal set;

a second silicon controlled rectifier, wherein an anode of the second silicon controlled rectifier is connected with the third node, a cathode of the second silicon controlled rectifier is connected with the first node, and a gate control terminal of the second silicon controlled rectifier receives a third control signal of the control signal set;

a third silicon controlled rectifier, wherein an anode of the third silicon controlled rectifier is connected with the fourth node, a cathode of the third silicon controlled rectifier is connected with the first node, and a gate control terminal of the third silicon controlled rectifier receives a fourth control signal of the control signal set, wherein the second node, the third node and the fourth node are connected with the AC power source.

6. The protection circuit as claimed in claim 1, wherein the protection circuit further comprises a driving circuit, and the driving circuit is connected between the first node and the ground terminal, wherein when the control circuit is enabled, the control circuit issues a driving signal set to the driving circuit.

* * * * *